(12) United States Patent
Kim et al.

(10) Patent No.: US 11,724,252 B2
(45) Date of Patent: Aug. 15, 2023

(54) SYNTHESIS OF METAL OXIDE CATALYSTS USING SUPERCRITICAL CARBON DIOXIDE EXTRACTION

(71) Applicant: KOREA INSTITUTE OF SCIENCE AND TECHNOLOGY, Seoul (KR)

(72) Inventors: Jongsik Kim, Seoul (KR); Heon Phil Ha, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 8 days.

(21) Appl. No.: 17/324,542

(22) Filed: May 19, 2021

(65) Prior Publication Data
US 2021/0402385 A1 Dec. 30, 2021

(30) Foreign Application Priority Data

Jun. 30, 2020 (KR) .................... 10-2020-0080217

(51) Int. Cl.
*B01J 37/02* (2006.01)
*B01J 6/00* (2006.01)
(Continued)

(52) U.S. Cl.
CPC .......... *B01J 37/0236* (2013.01); *B01J 6/001* (2013.01); *B01J 21/063* (2013.01); *B01J 23/34* (2013.01);
(Continued)

(58) Field of Classification Search
CPC ...... B01J 37/0236; B01J 6/001; B01J 21/063; B01J 23/34; B01J 35/1057; B01J 35/1061;
(Continued)

(56) References Cited

U.S. PATENT DOCUMENTS 4,916,108 A * 4/1990 McLaughlin ........ B01J 37/0201
502/345
6,413,903 B1 * 7/2002 Kourtakis ............ C07D 307/36
502/247
(Continued)

FOREIGN PATENT DOCUMENTS

JP 3760717 B2 3/2006
KR 10-0878459 B1 1/2009
(Continued)

OTHER PUBLICATIONS

Liu Chang et al., "Manganese oxide-based catalysts for low-temperature selective catalytic reduction of NOx with NH3: A review", Applied Catalysis A: General, Elsevier, Amsterdam, NL, vol. 522, Apr. 27, 2016 (Apr. 27, 2016), pp. 54-69, XP029568176,ISSN: 0926-860X, DOI: 10.1016/J.APCATA.2016.04.023.
(Continued)

*Primary Examiner* — Patricia L. Hailey
(74) *Attorney, Agent, or Firm* — Rabin & Berdo, P.C.

(57) ABSTRACT

A metal oxide catalyst synthesized using supercritical carbon dioxide extraction is provided, wherein the metal oxide catalyst includes an active site containing at least one type of metal oxide and a support for loading the active site and the metal oxide is an oxide of a metal selected from the group consisting of transition metals (atomic number 21 to 29, 39 to 47, 72 to 79, or 104 to 108), lanthanide (atomic number 57 to 71), post-transition metals (atomic number 13, 30 to 31, 48 to 50, 80 to 84, and 112), and metalloids (atomic number 14, 32 to 33, 51 to 52, and 85) in the periodic table, and a combination thereof.

6 Claims, 11 Drawing Sheets

(51) Int. Cl.
*B01J 21/06* (2006.01)
*B01J 23/34* (2006.01)
*B01J 35/10* (2006.01)
*B01J 37/00* (2006.01)
*B01J 37/03* (2006.01)

(52) U.S. Cl.
CPC ....... *B01J 35/1057* (2013.01); *B01J 35/1061* (2013.01); *B01J 35/1066* (2013.01); *B01J 35/1071* (2013.01); *B01J 37/0018* (2013.01); *B01J 37/035* (2013.01)

(58) Field of Classification Search
CPC .............. B01J 35/1066; B01J 35/1071; B01J 37/0018; B01J 37/035
USPC .......................................... 502/182, 305–355
See application file for complete search history.

(56) References Cited

U.S. PATENT DOCUMENTS

| | | | | |
|---|---|---|---|---|
| 7,211,607 B2* | 5/2007 | Gash | ...................... | B82Y 30/00 521/64 |
| 2010/0086457 A1* | 4/2010 | Soloveichik | ............. | B01J 23/50 502/223 |
| 2010/0190639 A1* | 7/2010 | Worsley | ................. | B01J 21/063 502/185 |
| 2010/0294646 A1* | 11/2010 | Kim | ..................... | B01J 31/1815 422/186.3 |
| 2012/0225771 A1* | 9/2012 | Miyazawa | ............... | B01J 3/008 422/187 |
| 2012/0289740 A1* | 11/2012 | Tan | ........................ | B01J 35/006 502/262 |
| 2020/0215518 A1 | 7/2020 | Kim et al. | | |

FOREIGN PATENT DOCUMENTS

| | | |
|---|---|---|
| KR | 102045919 B1 | 11/2019 |
| WO | 2006075840 A1 | 7/2006 |

OTHER PUBLICATIONS

Padmanabha Reddy Ettireddy et al., "Surface characterization studies of TiO2 supported manganese oxide catalysts for low temperature SCR of NO with NH3", Applied Catalysis B. Environmental, Elsevier, Amsterdam, NL, vol. 76, No. 1-2, Oct. 9, 2007 (Oct. 9, 2007), pp. 123-134,XP022290242,ISSN: 0926-3373, DOI: 10.1016/J.APCATB.2007.05.010.

Extended European Search Report dated Nov. 30, 2021, for the related European Patent Application No. 21182531.0.

* cited by examiner

SYNTHESIS OF METAL OXIDE CATALYSTS USING SUPERCRITICAL CARBON DIOXIDE EXTRACTION

CROSS-REFERENCE TO RELATED APPLICATION(S)

This application claims the benefit under 35 USC § 119(a) of Korean Patent Application No. 10-2020-0080217, filed on Jun. 30, 2020, in the Korean Intellectual Property Office, the entire disclosure of which is incorporated herein by reference for all purposes.

BACKGROUND

1. Field

The following description relates to synthesis of a metal oxide catalyst using supercritical carbon dioxide ($CO_2$) extraction and to control/enhancement of rate and performance in heterogeneous catalysis using the metal oxide catalyst. Specifically, the following description relates to the control of surface properties based on preferred implementation of the crystal structure/porosity of a support, dispersity/crystal phase of metal oxide active sites in the support, and the like, and to improvement of rate/performance of a catalyst based thereon.

2. Description of Related Art

Heterogeneous catalytic solids are generally composed of active sites and a support that highly disperses the active sites. When a porous solid with low chemical/physical (thermal) stability is used as a support for a catalyst, the existing reported methods (e.g., filtration, washing, or thermal drying) for removing synthetic solvent used for dispersion of active site precursors to the support often cause damage/collapse of a preferred structure of the support/active site or aggregation of the active sites after firing (or calcining). This is due to the chemical bond (e.g., dative bond, coordinative bond, or hydrogen bond) between solvent and the support/active site and the surface tension of synthetic solvent, and specifically due to the capillary effect in which the synthetic solvent strongly attracts the support/active sites during removal from support pores. A supercritical carbon dioxide ($CO_2$) fluid may provide characteristics of 1) small viscosity, 2) high diffusivity into miscibility with solvents with various polarities, and 3) weak interaction with solid support/active sites. Thus, the supercritical $CO_2$ fluid may be contained in pores of a porous support having small chemical/physical (thermal) stability, or may stably remove/extract the synthetic solvent that significantly interacts with the support/active site, and hence minimize damage and deformation of surface properties of a solid catalyst.

Solid metal oxide catalysts synthesized using supercritical $CO_2$ extraction may activate various heterogeneous catalytic reactions, and specifically, N—O/N—H/C—O/O—H bonds inherent in reactants, or provide high activity, conversion, or selectivity in fragmentation reactions. More specifically, the distribution/number/intensity of Brönsted acid sites, Lewis acid sites, surface labile oxygen species, oxygen vacancies, etc., which may exist on a surface of a metal oxide catalyst formed by firing (or calcination) after supercritical treatment, and the redox properties are preferably implemented/controlled, so that the rate, conversion, or selectivity of heterogeneous catalytic reaction involving at least one of the acid sites, the oxygen species, or the oxygen vacancies can be improved or maximized.

For example, in a nitrogen oxide ($NO_X$, X=1 or 2) selective catalytic reduction (SCR) reaction (see Reaction Formulas (1) and (2)) in which $NO_X$, which is a precursor of fine dust, is reduced using ammonia ($NH_3$) to selectively form nitrogen ($N_2$) and water ($H_2O$), the productivity of nitrogen/water may be improved by selectively activating the N—O bonds of the $NO_X$.

$$4NO+4NH_3+O_2 \rightarrow 4N_2+6H_2O \quad (1)$$

$$2NO_2+4NH_3+O_2 \rightarrow 3N_2+6H_2O \quad (2)$$

In addition, for example, the N—H bonds in ammonia ($NH_3$), which is a precursor of fine dust, are selectively activated and oxidized using oxygen ($O_2$) (selective catalytic NH3 oxidation (SCO)), wherein the selectivity to nitrogen (see Reaction Formula (3)), which is a desirable product, may be improved and the selectivity to undesired products, such as NOX (see Reaction Formulas (4) and (5)) and nitrous oxide ($N_2O$) (see Reaction Formula (6)), may be minimized.

$$4NH_3+3O_2 \rightarrow 2N_2+6H_2O \quad (3)$$

$$4NH_3+5O_2 \rightarrow 4NO+6H_2O \quad (4)$$

$$4NH_3+7O_2 \rightarrow 4NO_2+6H_2O \quad (5)$$

$$4NH_3+2O_2 \rightarrow N_2O+3H_2O \quad (6)$$

However, despite the considerable advantages and expected effects in the synthesis of metal oxide catalysts using the supercritical $CO_2$ extraction and in the proposed catalytic reaction examples, so far, no examples have been implemented.

PRIOR ART DOCUMENT

Patent Document (Patent Document 1) Korean Registered Patent Publication No. 10-0878459

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

An objective of the present invention is to provide a novel synthesis method for a heterogeneous catalyst using supercritical carbon dioxide ($CO_2$) extraction which can provide an increased rate, conversion, or selectivity to selective activation reactions of N—O/N—H/C—O/O—H bonds inherent in reactants compared to the existing catalyst preparation method.

Another objective of the present invention is to provide a methodology that can control the redox properties, and the distribution/number/intensity of Brönsted acid sites, Lewis acid sites, surface labile oxygens, oxygen vacancies, etc. to be suitable for the selective activation reaction of N—O/N—H/C—O/O—H bonds. However, these objectives are exemplary and the scope of the present invention is not limited thereto.

According to one aspect of the present invention, there is provided a method of synthesizing a metal oxide catalyst, which includes an active site containing at least one type of metal oxide and a support for loading the active site, the method using supercritical carbon dioxide ($CO_2$) extraction.

The method may include: precipitating a precursor of metal oxide catalyst crystalline grains onto a surface of a support after dissolving the precursor of the metal oxide catalyst crystalline grains in a synthetic solvent; drying a catalyst crystalline grain precursor-support intermediate product using supercritical $CO_2$ extraction; and calcining the dried catalyst crystalline grain precursor-support intermediate product to synthesize a metal oxide catalyst.

The supercritical $CO_2$ extraction may be performed at a temperature ranging from 50 to 150° C., for 0.1 to 24 hours, at a flow rate ranging from $10^{-5}$ to $10^5$ mL min$^{-1}$, and at a $CO_2$ pressure ranging from 75 to 150 atm.

A supercritical $CO_2$ fluid extracted by the supercritical $CO_2$ extraction may weaken an interaction between the support and the synthetic solvent.

According to another aspect of the present invention, there is provided a heterogeneous catalyst including an active site containing at least one type of metal oxide and a support capable of dispersing the active site.

A metal of the metal oxide catalyst crystalline grain may be at least one selected from the group consisting of transition metals (atomic number 21 to 29, 39 to 47, 72 to 79, or 104 to 108), lanthanide (atomic number 57 to 71), post-transition metals (atomic number 13, 30 to 31, 48 to 50, 80 to 84, and 112), and metalloids (atomic number 14, 32 to 33, 51 to 52, and 85) in the periodic table, or a combination thereof.

The support may be at least one selected from the group consisting of alkaline earth metals (atomic number 4, 12, 20, 38, 56, and 88), transition metals (atomic number 21-29, 39-47, and 72-79, or 104-108), lanthanide (atomic number 57-71), post-transition metals (atomic number 13, 30-31, 48-50, 80-84, and 112), and metalloids (atomic number 14, 32-33, 51-52, and 85) in the periodic table, or carbon (C), or a combination thereof, or may contain at least one oxide of the above element.

The catalyst crystalline grain or support may have a porous structure.

The catalyst crystalline grain may have a diameter of 0.1 nm to 500 μm.

The catalyst crystalline grain may have a composition range of $10^{-4}$ to 50 parts by weight based on 100 parts by weight of the support.

Other features and aspects will be apparent from the following detailed description, the drawings, and the claims.

Figure 1A:
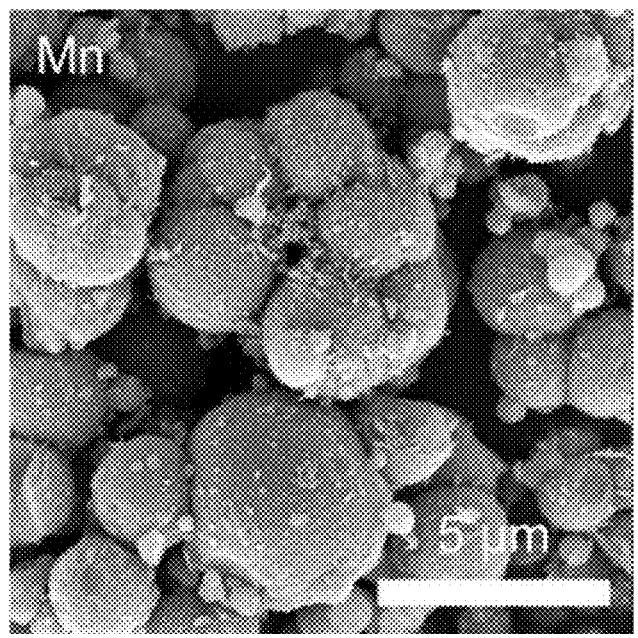
FIG. 1A to 1D show the results of scanning electron microscopic (SEM) observation (first line) and high resolution transmission electron microscopic (HRTEM) observation (second line) of catalysts synthesized in Embodiments 1 and 2 of the present invention.
Figure 1B:
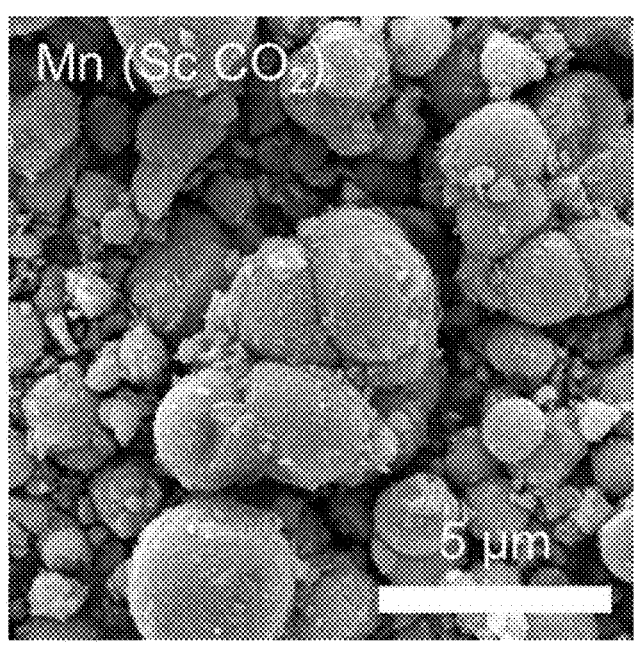
Figure 1C:
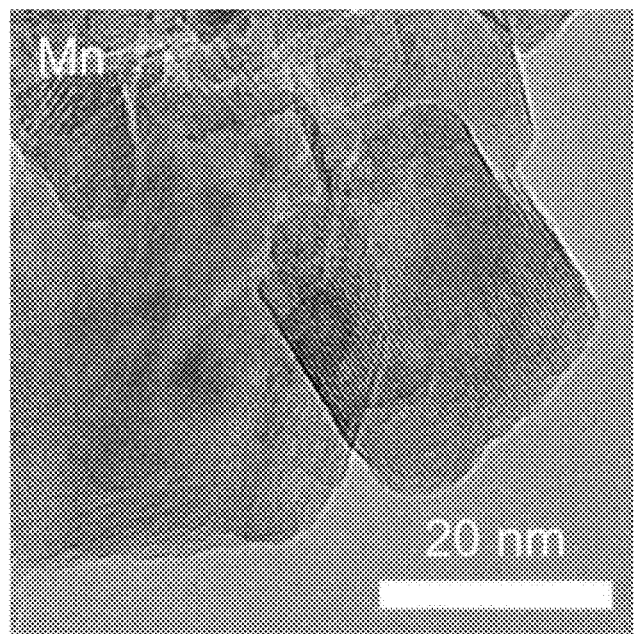
Figure 1D:
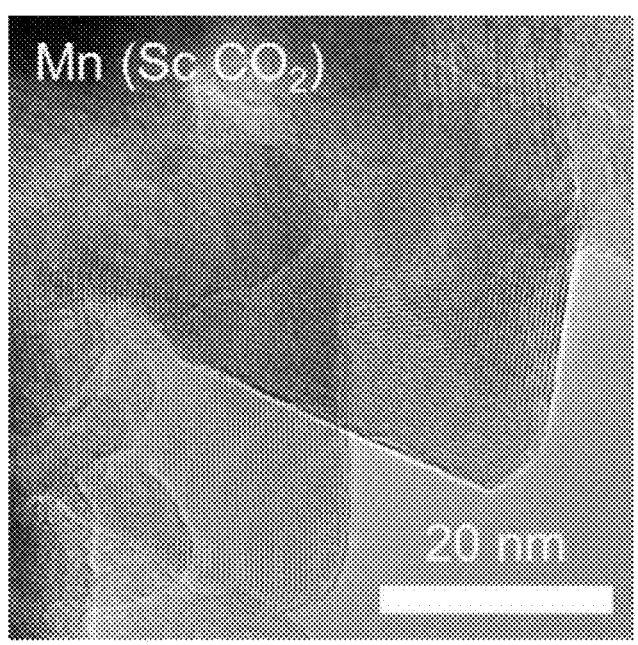

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed descriptions of the invention will be made with reference to the accompanying drawings illustrating specific embodiments of the invention by way of example. These embodiments will be described in detail such that the invention can be carried out by one of ordinary skill in the art. It should be understood that various embodiments of the invention are different, but are not necessarily mutually exclusive.

For example, a specific shape, structure, and characteristic of an embodiment described herein may be implemented in another embodiment without departing from the scope of the invention. In addition, it should be understood that a position or placement of each component in each disclosed embodiment may be changed without departing from the scope of the invention.

Accordingly, there is no intent to limit the invention to the following detailed descriptions. The scope of the invention is defined by the appended claims and encompasses all equivalents that fall within the scope of the appended claims. In the drawings, like reference numerals denote like functions, and the sizes of elements may be exaggerated for convenience of explanation.

Hereinafter, to allow one of ordinary skill in the art to easily carry out the invention, embodiments of the present invention will be described in detail with reference to the accompanying drawings.

A metal oxide catalyst according to an embodiment of the present invention includes an active site corresponding to a region onto which a reactant is adsorbed and from which a product is detached after reaction, and a support for loading the active site thereon.

A method of synthesizing the catalyst composed of the above-described active site and support by using supercritical carbon dioxide ($CO_2$) extraction includes 1) precipitating a precursor of metal oxide catalyst crystalline grains onto a surface of the support, 2) drying a catalyst crystalline grain precursor-support intermediate product using supercritical $CO_2$ extraction (removing a synthetic solvent), and 3) calcining the dried catalyst crystalline grain precursor-support intermediate product to synthesize a metal oxide catalyst.

The aforementioned catalyst crystalline grain precursor-support intermediate product may be prepared by various methods. For example, the catalyst crystalline grain precursor-support intermediate product may be prepared by one or more of hydrothermal synthesis, solvent thermal synthesis, non-templated or templated synthesis, wet or dry impregnation with pH control, or thermal decomposition using metal complex. However, in order to maximize the advantages provided by the supercritical $CO_2$ extraction described above/below, it is preferable to prepare an intermediate product in which a precursor of catalyst crystalline grains is precipitated onto a support.

The supercritical $CO_2$ extraction for removing the synthetic solvent by drying the catalyst crystalline grain precursor-support intermediate product described above may be carried out by loading the precursor-support intermediate product on a batch type/continuous type reactor, thereafter exposing the surface of the intermediate product to a carbon dioxide processing gas under a predetermined flow rate/temperature/pressure, preferably at a temperature and pressure (31° C. or higher and 72.8 atm or higher) at which a supercritical carbon dioxide fluid is generated. Table 1 below shows a range of conditions for generating a supercritical carbon dioxide fluid.

TABLE 1

| $CO_2$ pressure (atm) | Processing gas flow rate (mL min$^{-1}$) | Exposure time (h) | Temperature (° C.) |
|---|---|---|---|
| 75-150 | $10^{-5}$~$10^5$ | 0.1~24 | 50-150 |

When supercritical carbon dioxide extraction is performed under the condition of a temperature of 50° C., 0.1 hours, a flow rate of $10^{-5}$ mL min$^{-1}$, or a $CO_2$ pressure of less than 75 atm, the effect of supercritical carbon dioxide extraction from the catalyst surface may be insignificant. On the other hand, when the supercritical carbon dioxide extraction is performed under the conditions of a temperature of 150° C., 24 hours, a flow rate of 105 mL min$^{-1}$, or a $CO_2$ pressure of greater than 150 atm, the structure of an active site/support may be damaged/deformed, surface labile oxygen species/oxygen vacancies may be eliminated, or redox properties may be severely deteriorated. Accordingly, the supercritical carbon dioxide extraction for removing the synthetic solvent included in the precursor-support intermediate product may be performed within the range of the above-described conditions.

The metal oxide catalyst according to an embodiment of the present invention includes at least one selected from the group consisting of transition metals (atomic number 21 to 29, 39 to 47, 72 to 79, or 104 to 108), lanthanide (atomic number 57 to 71), post-transition metals (atomic number 13, 30 to 31, 48 to 50, 80 to 84, and 112), and metalloids (atomic number 14, 32 to 33, 51 to 52, and 85) in the periodic table, or a combination thereof, as an active site.

A method of preparing a metal oxide catalyst according to an embodiment of the present invention uses supercritical $CO_2$ extraction to remove a synthetic solvent used to dissolve an active site precursor, wherein the stoichiometry of a metal and oxygen is controlled by adjusting the firing (or calcination) condition. In addition, a metal-oxygen coordination bond or the like may be controlled by implementing various metal oxide structures, and thereby the redox properties and the distribution/number/intensity of Brönsted acid sites, Lewis acid sites, surface labile oxygen species, oxygen vacancies, etc. present on the surface of a metal oxide may be preferably controlled irrespective of the type of metal used for preparing the active site.

For example, in the case of manganese oxide, 1) a synthetic solvent used to dissolve a manganese oxide precursor is removed by using supercritical $CO_2$ extraction, wherein the firing (or calcination) conditions may be adjusted, thereby 2) diversifying the structure to α-MnO2, γ-MnO2, Mn2O3, Mn3O4, etc., and 3) controlling the distribution and manganese oxidation number on a support surface of each structure and 4) the coordination number of Mn—O bonds inherent in the above structures, the number/intensity of vacancies or defects and the redox properties may be adjusted, thereby 5) controlling selective activation of the N—O bonds and N—H bonds and related performance.

The metal oxide active site according to an embodiment of the present invention may have porosity, and may be dispersed in a porous support described below.

The metal oxide active site according to an embodiment of the present invention may have a diameter (maximum diameter) of 0.1 nm to 500 µm, and may have a composition range of $10^{-4}$ to 50 parts by weight based on 100 parts by weight of the support.

The metal oxide catalyst according to an embodiment of the present invention includes at least one selected from the group consisting of alkaline earth metals (atomic number 4, 12, 20, 38, 56, and 88), transition metals (atomic number 21-29, 39-47, and 72-79, or 104-108), lanthanide (atomic number 57-71), post-transition metals (atomic number 13, 30-31, 48-50, 80-84, and 112), and metalloids (atomic number 14, 32-33, 51-52, and 85) in the periodic table, or carbon (C), or a combination thereof, as the support.

The support uses supercritical $CO_2$ extraction to 1) minimize the structural collapse and the damage to porosity and, 2) improve the dispersity of active sites in the pores or the support surface, and 3) preferably control the redox properties and the distribution/number/intensity of surface labile oxygen species and oxygen vacancies irrespectively of the type of metal used for preparing the support.

Specifically, the effect of the supercritical $CO_2$ extraction proposed in the present invention is enormous when applied to a support having microporosity. This is because the supercritical carbon dioxide fluid significantly weakens the interaction between micropores and the synthetic solvent that dissolves the active site precursor. That is, since the surface tension and capillary effect of the synthetic solvent, which are problematic in the process of removing the synthetic solvent, can be considerably weakened, the collapse of micropores can be reduced when the synthetic solvent is removed, and the microporosity of the support may be maintained even after the calcination treatment. Therefore, the supercritical $CO_2$ extraction method may ultimately implement the surface properties of active sites desirable for selective activation of bonds inherent in reactants, such as N—O bonds, N—H bonds, C—O bonds, or O—H bonds, within a range that does not inhibit the dispersity of the active sites dispersed in the micropores.

Specifically, the effect of the supercritical $CO_2$ extraction proposed in the present invention is enormous when applied to a reducible support (e.g., $CeO_2$ or $TiO_2$) that may contain labile oxygen species or oxygen vacancies on the surface thereof. This is because 1) the redox properties and the number/distribution of labile oxygen species or oxygen vacancies exposed to the surface after calcination treatment can be maximized by efficiently removing organic matter/impurities contained in the synthetic solvent or active site precursor before the calcination treatment and 2) the redox properties and the interaction (bond strength) between the labile oxygen species or oxygen vacancies and the catalytic reactant can be controlled by controlling the supercritical $CO_2$ extraction or calcination treatment conditions.

Hereinafter, the present invention will be described in detail by explaining embodiments of the invention. The invention may, however, be embodied in many different forms and should not be construed as being limited to the embodiments set forth herein.

Embodiments 1 and 2: Preparation of Mn and Mn(Sc CO2) Catalysts 37.5 mL of distilled water in which 6.9 g of sulfuric acid (98% $H_2SO_4$) was dissolved was heated to 50° C., and then added with 11.25 g of $TiOSO_4$, a titanium salt, and dissolved for 30 minutes. Thereafter, after adding thereto 75 g of urea ($CO(NH_2)_2$) and 500 mL of distilled water, the temperature of the mixture was raised to 100° C. and the mixture was stirred for 18 hours. A formed intermediate product was cooled to 25° C. and then filtered/washed with distilled water, and an obtained solid was exposed for about 30 minutes in a supercritical CO2 (99.99%) fluid (Sc $CO_2$) obtained under the conditions of a temperature of 60 to 70° C. and a pressure of 90 to 100 atm and thereafter subjected to calcination at 400° C. for 3 hours to obtain a titanium oxide ($TiO_2$) with hierarchical porosity having both mesoporosity and microporosity. The catalysts of Embodiments 1 and 2 were synthesized using $TiO_2$ as a support. In order to synthesize the catalysts of Embodiment 1, 1.95 g of $Mn(NO_3)_2 \cdot XH_2O$, a manganese salt, and 3.4 g of $TiO_2$ were added to 250 mL of distilled water and then stirred at 25° C. for 30 minutes, and then the pH of the liquid mixture was adjusted to 10 by using $NH_4OH$. After stirring at 25° C. for 18 hours, the mixture was dehydrated and subjected to calcination at 400° C. for 3 hours to obtain the catalyst of Embodiment 1, which was referred to as Mn. To synthesize the catalysts of Embodiment 2, 1.95 g of $Mn(NO_3)_2 \cdot XH_2O$, a manganese salt, and 3.4 g of $TiO_2$ were added to 250 mL of distilled water, and stirred at 25° C. for 30 minutes, and then the pH of the liquid mixture was adjusted to 10 by using $NH_4OH$. After stirring at 25° C. for 18 hours, the mixture was filtered/washed with distilled water. An obtained solid was exposed for about 30 minutes in a supercritical $CO_2$ (99.99%) fluid (Sc $CO_2$) obtained under the conditions of a temperature of 60 to 70° C. and a pressure of 90 to 100 atm and then subjected to calcination at 400° C. for 3 hours to obtain the catalyst of Embodiment 2, which was referred to as Mn(Sc $CO_2$).

Experimental Example 1: Analysis of Catalytic Characters

Surface morphologies of the catalysts synthesized according to Embodiments 1 and 2 were analyzed using scanning electron microscopy (SEM) and high-resolution transmission electron microscopy (HRTEM), and the results thereof are shown in FIG. 1A to 1D. Referring to FIG. 1A to 1D, they are shown that $TiO_2$ agglomerates having grain sizes (maximum diameters) of several hundred nanometers to several hundred micrometers configure porous supports in the synthesized catalysts.

In order to check porosity of the catalysts of Embodiments 1 and 2, a nitrogen gas ($N_2$) physisorption test was performed to measure the micropore surface areas (SMICRO) and the mesopore surface areas (SMESO) of the catalysts by applying the non-localized density functional theory. In addition, components of the catalysts synthesized according to Embodiments 1 and 2 were analyzed using X-ray fluorescence (XRF). The results thereof are shown in Table 2.

TABLE 2

| Catalyst | $S_{MICRO}$ | $S_{MESO}$ | Catalyst content (mmol g−1) Theoretical value | Observed value |
|---|---|---|---|---|
| Embodiment 1 | 25.5 m² g⁻¹ | 100.4 m² g⁻¹ | Mn: 2.73 | Mn: 2.75 |
| Embodiment 2 | 21.9 m² g⁻¹ | 93.6 m² g⁻¹¹ | Mn: 2.73 | Mn: 2.74 |

The results of measuring the micropore surface areas (SMICRO) and mesopore surface areas (SMESO) showed that the catalysts synthesized according to Embodiment 1 and 2 had hierarchical porosity in which micropores and mesopores were mixed. In addition, it was confirmed that there was reasonable agreement between the theoretical and observed values for the content of catalytic active sites. Specifically, in Embodiments 1 and 2, it can be seen that the catalysts had approximately 15 wt % of Mn (~2.73 mmol Mn g⁻¹), which indicates that the catalysts synthesized by the supercritical $CO_2$ extraction and the catalysts synthesized without the supercritical $CO_2$ extraction had similar contents of active sites.

Figure 2:
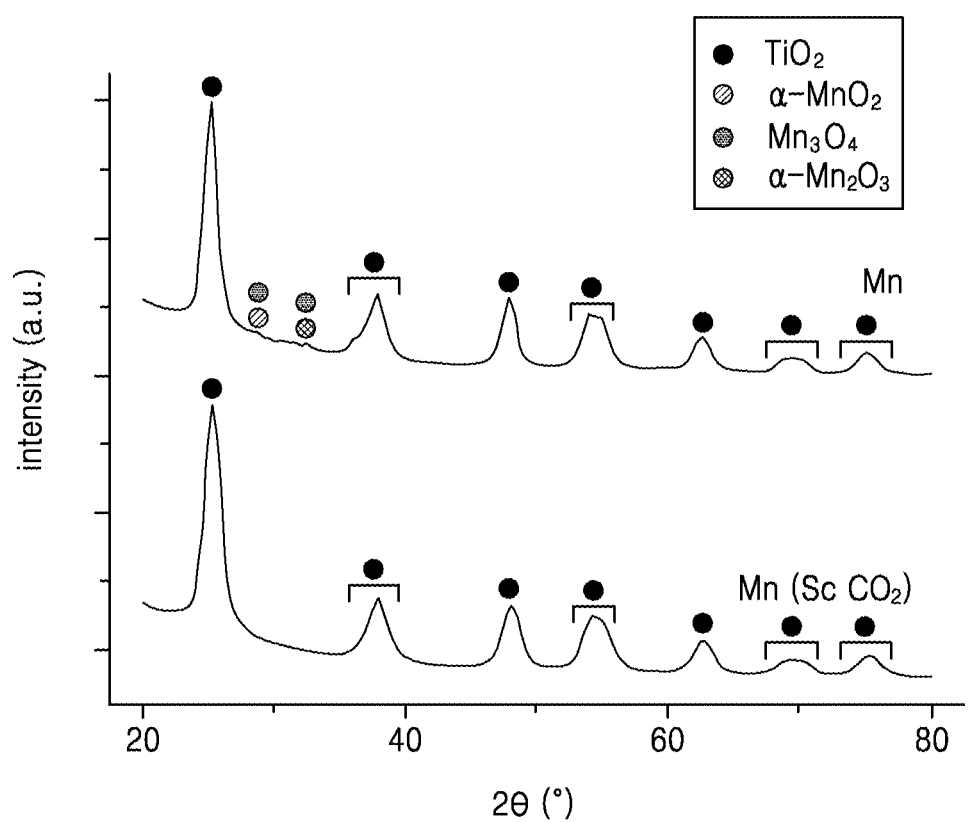
FIG. 2 is a graph showing X-ray diffraction (XRD) patterns of the catalysts synthesized in Embodiments 1 and 2 of the present invention.

Crystal structures of Embodiments 1 and 2 were analyzed using an X-ray diffractometer, and X-ray diffraction (XRD) patterns obtained as results thereof are shown in FIG. 2. Referring to FIG. 2, it can be seen that all of the catalysts in Embodiments 1 and 2 included crystal planes of anatase phase having tetragonal crystal structure which indicates a $TiO_2$ support. Meanwhile, crystal planes of α-$MnO_2$ phase having tetragonal crystal structure, γ-$MnO_2$ phase having orthorhombic crystal structure, α-$Mn_2O_3$ phase having cubic crystal structure, and $Mn_3O_4$ phase having tetragonal crystal structure were observed on the X-ray diffraction pattern of Embodiment 1, but the crystal planes of manganese oxides described above were not observed on the X-ray diffraction pattern of Embodiment 2. This may be because the bulk crystal structure of the manganese oxides of Embodiment 2 synthesized by the supercritical $CO_2$ extraction process was small to be detected through X-ray diffraction analysis.

Figure 3A:
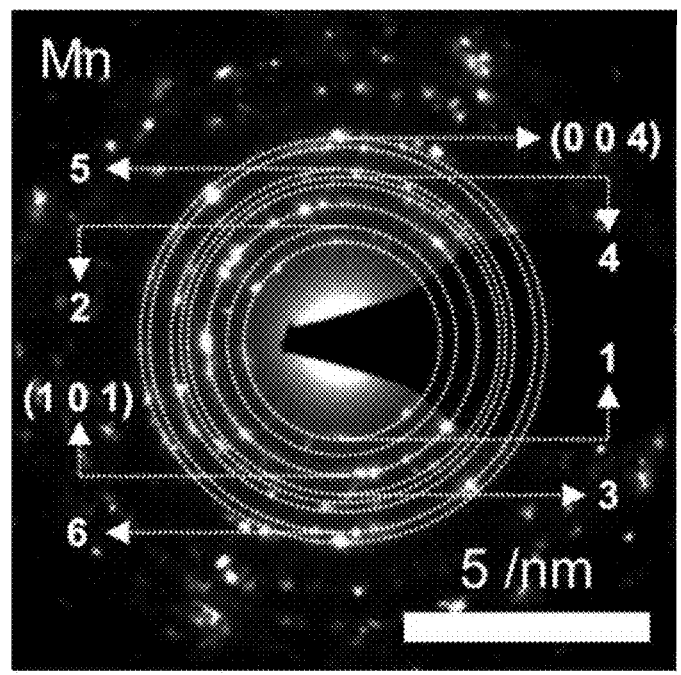
FIGS. 3A and 3B are graphs showing selected area electron diffraction (SAED) patterns of the catalysts synthesized in Embodiments 1 and 2 of the present invention.
Figure 3B:
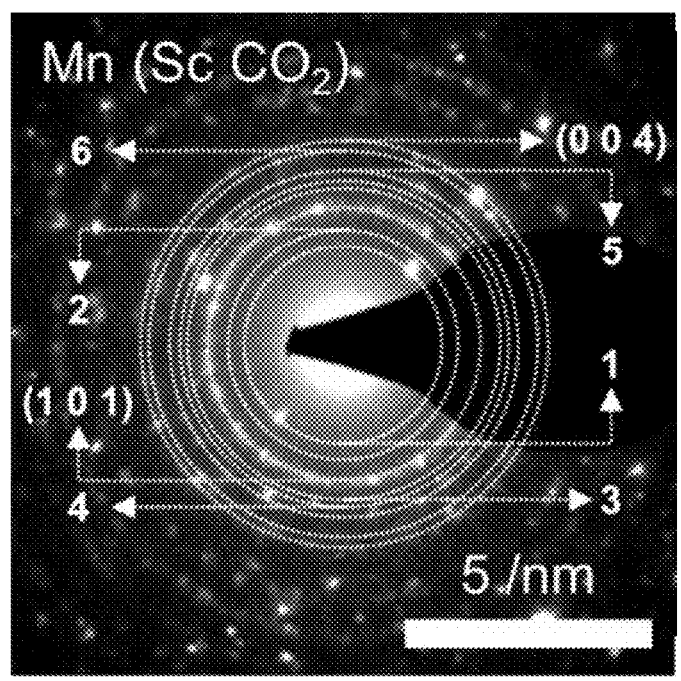

Accordingly, the catalysts of Embodiments 1 and 2 were analyzed using a selected area electron diffraction (SAED) pattern, and the results thereof are shown in FIGS. 3A and 3B. Referring to FIGS. 3A and 3B, as in the result of X-ray diffraction analysis, (1 0 1) and (0 0 4) planes of anatase phase having tetragonal crystal structure were commonly observed (see red concentric circles). In addition, crystal planes of α-$MnO_2$ phase having tetragonal crystal structure (yellow concentric circles 1 and 3), γ-$MnO_2$ phase having orthorhombic crystal structure (yellow concentric circles 2), α-$Mn_2O_3$ phase having cubic crystal structure (yellow concentric circles 6), and $Mn_3O_4$ phase having tetragonal crystal structure (yellow concentric circles 1-6) were also commonly observed. Thus, it was confirmed that the manganese oxides, which were the catalytic active sites of Embodiments 1 and 2, were successfully dispersed in the $TiO_2$ support having hierarchical porosity.

Figure 4A:
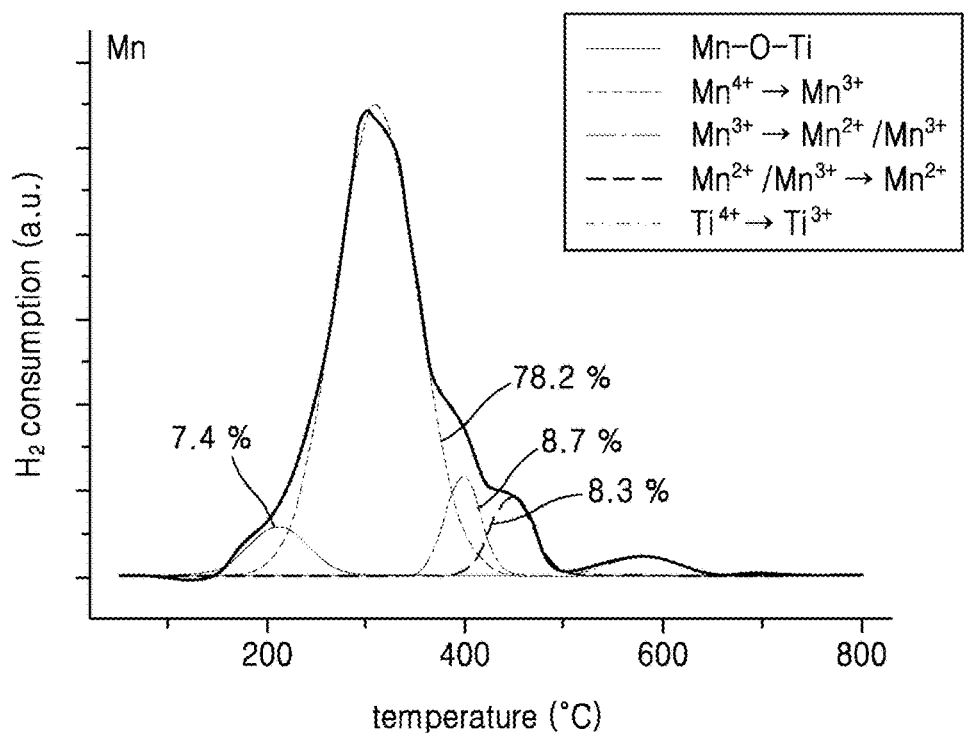
FIGS. 4A and 4B are graphs showing $H_2$-temperature programmed reduction ($H_2$-TPR) profiles of the catalysts synthesized in Embodiments 1 and 2 of the present invention.
Figure 4B:
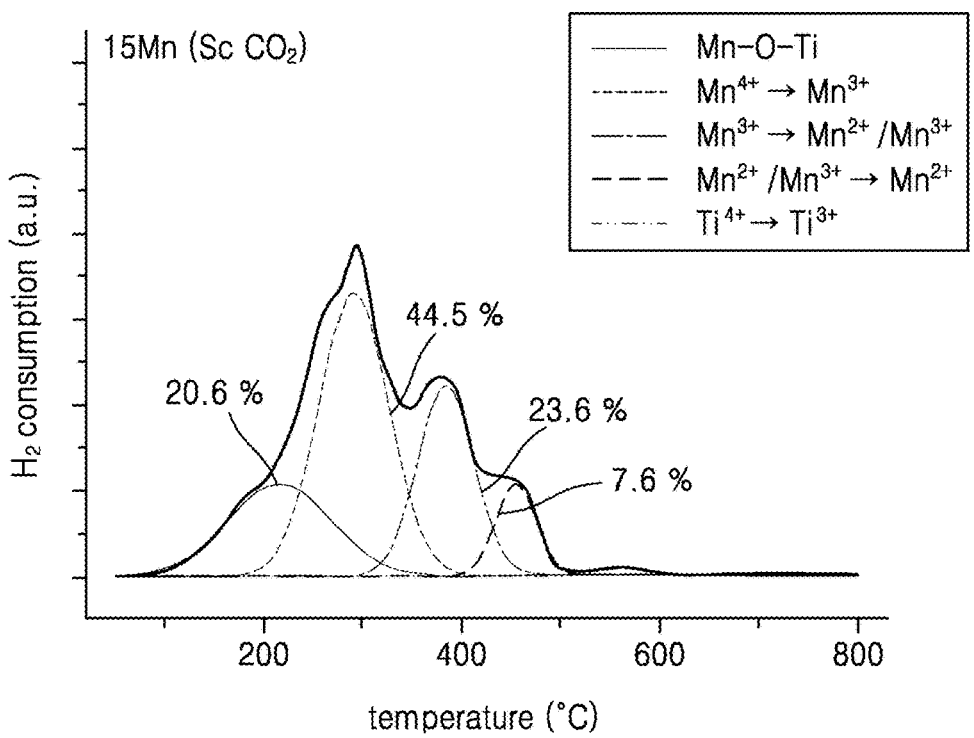

In order to check interaction between the active site (manganese oxide) and the support ($TiO_2$) of the catalysts of Embodiments 1 to 2, the $H_2$-temperature programmed reduction ($H_2$-TPR) technique was used. Results ($H_2$-TPR spectra) thereof are shown in FIGS. 4A and 4B. Referring to FIGS. 4A and 4B, five bands were observed in the $H_2$-TPR spectra of Embodiments 1 and 2, they respectively represent the degree of interaction between manganese oxide and $TiO_2$ (red band), reduction of $Mn^{4+}$ contained in manganese oxide to $Mn^{3+}$ (green band), reduction of $Mn^{3+}$ in manganese oxide to $Mn^{2+}/Mn^{3+}$ (blue band), reduction of $Mn^{2+}/Mn^{3+}$ in manganese oxide to $Mn^{2+}$ (light blue band), reduction of $Ti^{4+}$ in $TiO_2$ to $Ti^{3+}$ (purple band). More interactions (red band) between manganese oxide and $TiO_2$ were observed in Embodiment 2 than Embodiment 1 (7.4% in Embodiment 1 and 20.6% in Embodiment 2). This indicates that, as compared to Embodiment 1, Embodiment 2 reduced the chance for interaction between catalyst poisoning species (for example, $SO_2$ in the case of SCR reaction) contained in an exhaust gas and manganese oxide, which is an active site, during the reaction, thereby minimizing a poisoning phenomenon caused by the poisoning species, and the resistance of the catalyst to the poisoning species can be increased.

Figure 5A:
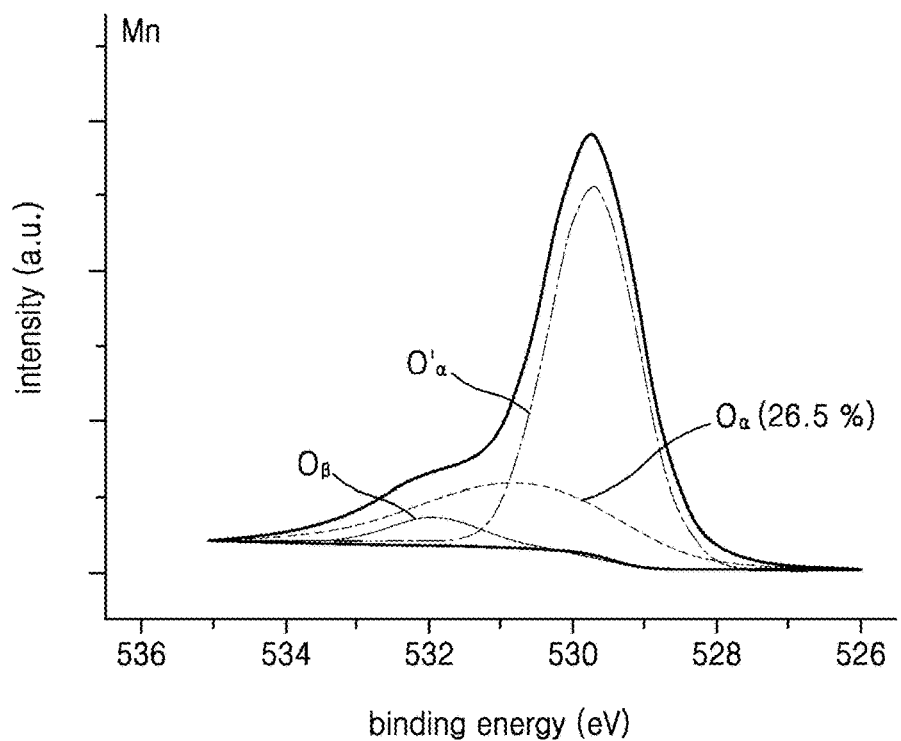
FIGS. 5A and 5B are graphs showing X-ray photoelectron (XP) spectra in the O 1s region of the catalysts synthesized in Embodiments 1 and 2 of the present invention.
Figure 5B:
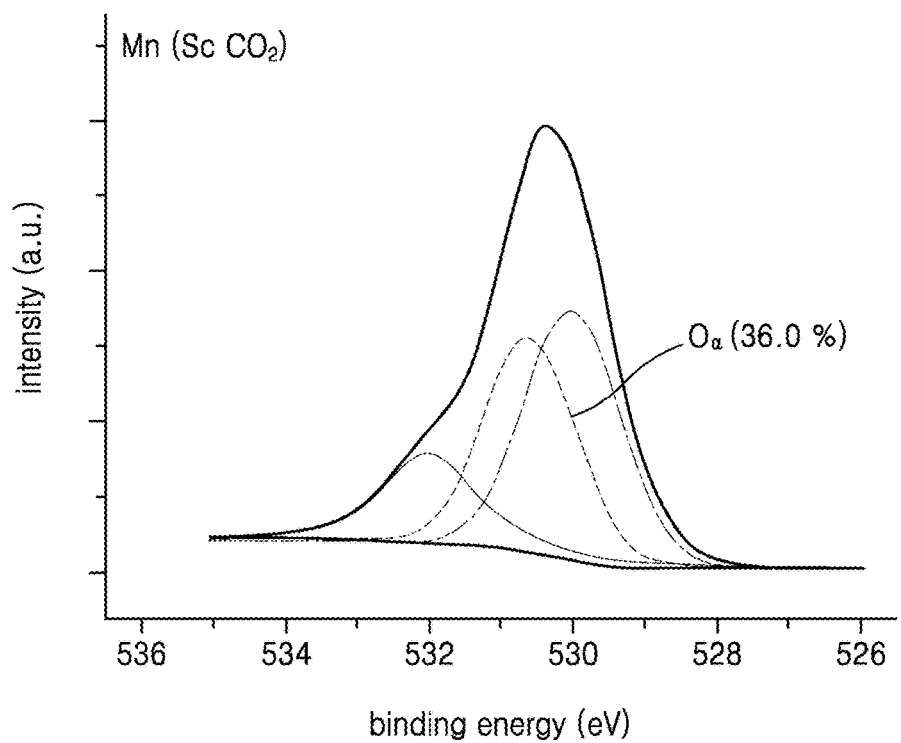

In order to analyze the redox properties of the catalysts of Embodiments 1 and 2, the X-ray photoelectron(XP) spectroscopy was used in the O 1s region, and the results thereof are shown in FIGS. 5A and 5B. Referring to FIGS. 5A and 5B, in the catalysts of Embodiments 1 and 2, oxygen species ($O_\alpha'$) existing in $H_2O$ chemically adsorbed on the catalyst surface, labile oxygen species ($O_\alpha$), and oxygen species ($O_\beta$) existing in a catalyst lattice were observed. In the case of Embodiment 2, it was observed that a greater amount of labile oxygen species ($O_\alpha$) was contained on the surface than that of Embodiment 1. This indicates that the catalyst of Embodiment 2 supplied a greater amount of labile oxygen species during the catalytic reaction, compared to the catalyst of Embodiment 1, thereby improving the rate and performance (conversion and selectivity) of the catalytic reaction.

Hereinafter, with reference to FIGS. 6 to 11, results of performance analysis in selective catalytic reduction (SCR) and selective catalytic oxidation (SCO) reactions of the catalysts according to Embodiments 1 and 2 of the present invention will be described.

Experimental Example 2: Performance Analysis of SCR Reaction (1)

Figure 6A:
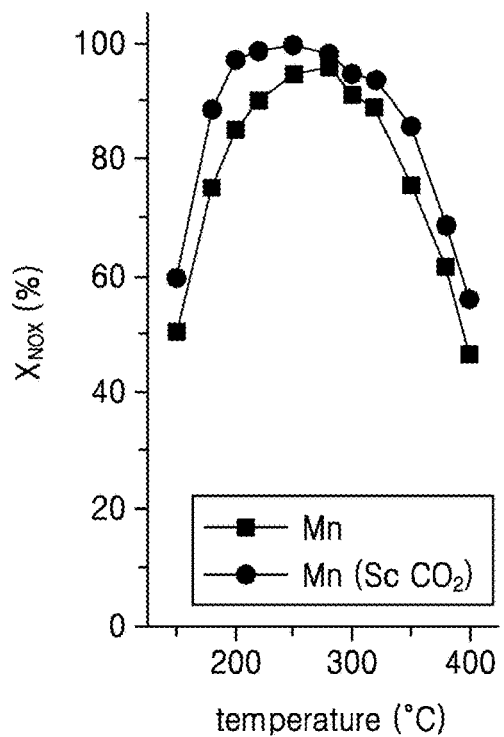
FIGS. 6A and 6B are graphs showing a nitrogen oxide ($NO_X$) conversion $X_{NOX}$ and nitrogen ($N_2$) selectivity $S_{N2}$ in a selective catalytic reduction (SCR) reaction of the catalysts synthesized in Embodiments 1 and 2.
Figure 6B:
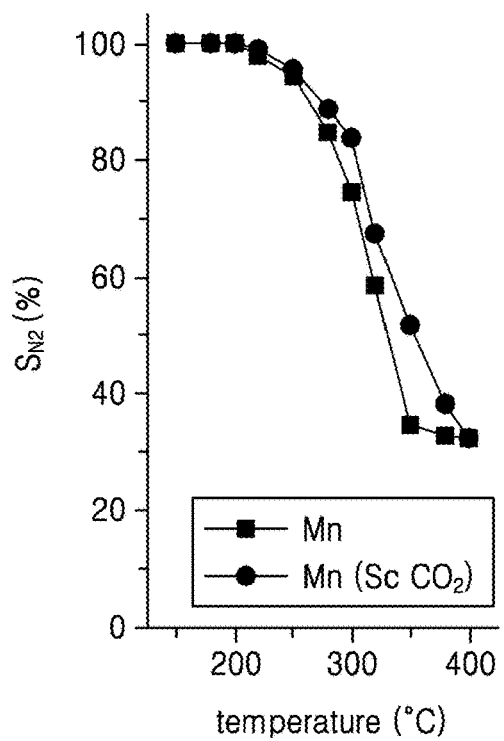

The performance of SCR process was measured using the catalysts of Embodiments 1 and 2. FIGS. 6A and 6B show a $NO_X$ conversion $X_{NOX}$ and nitrogen ($N_2$) selectivity $S_{N2}$ in a temperature range of 150° C. to 400° C. The SCR process was performed under the conditions that a reaction fluid contained 200 ppm of $NO_X$, 200 ppm of $NH_3$, 3 vol % of $O_2$, 6 vol % of $H_2O$, 500 ppm of $SO_2$, and an inert gas of $N_2$, a total flow rate was 500 mL·min$^{-1}$, and a space velocity was 30,000 hr$^{-1}$. Referring to FIGS. 6A and 6B, it can be seen that the catalyst of Embodiment 2 exhibited improved performance in the temperature range of 150° C. to 400° C. compared to that of Embodiment 1, which indicates that the catalyst of Embodiment 2 synthesized through the supercritical $CO_2$ extraction exhibited improved $N_2$ productivity due to the SCR reaction in a low temperature range (200° C. or less), lower side reactant ($N_2O$) productivity due to the SCR reaction in a middle temperature range (200° C. to 280° C.), and improved $N_2$ productivity due to the SCR and SCO reactions in a high temperature range (over 280° C.), when compared to the catalyst of Embodiment 1 synthesized by the conventional method. In addition, this indicates that the catalyst of Embodiment 2 has Brönsted acid, Lewis acid, and redox properties which are more desirable to selectively activate N—O bonds or N—H bonds than those of the catalyst of Embodiment 1 in the surface thereof.

Experimental Example 3: Performance Analysis of SCR Reaction (2)

Figure 7:
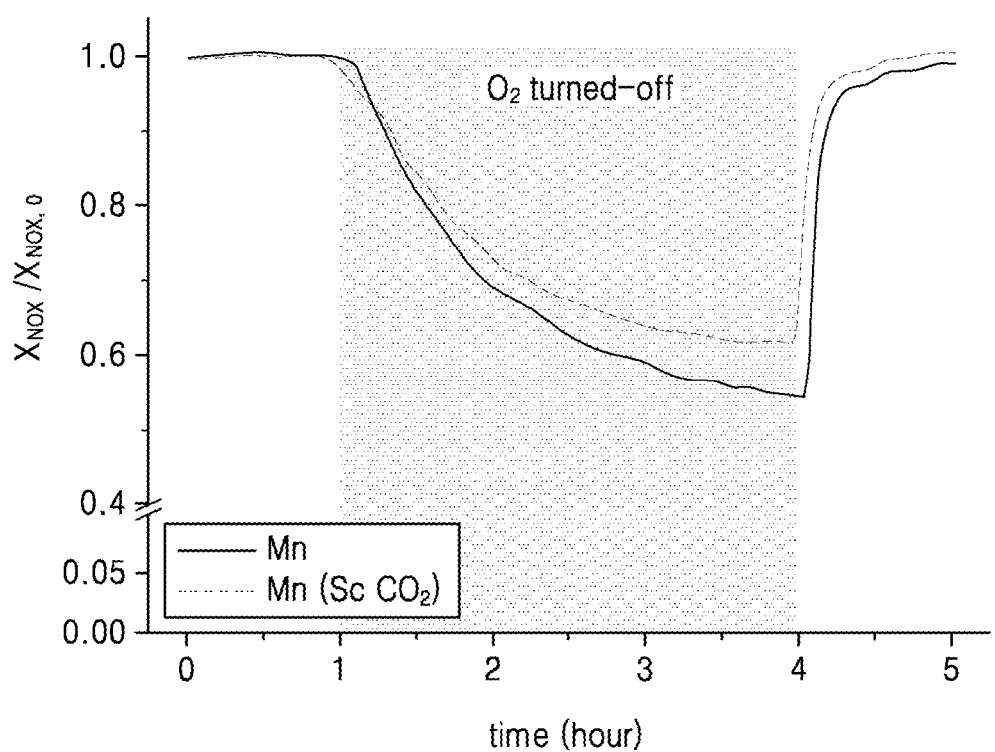
FIG. 7 is a graph showing the performance change $X_{NOX}/X_{NOX,0}$ according to the presence or absence of oxygen ($O_2$) in the SCR reaction of the catalysts synthesized in Embodiments 1 and 2.

The performance of SCR process was measured using the catalysts of Embodiments 1 and 2. A decrease trend of a $NO_X$ conversion $X_{NOX}$ in the presence or absence of O2 at 180° C. (1 to 4 hours) was divided by the initial $NO_X$ conversion $X_{NOX,0}$ and the result ($X_{NOX}/X_{NOX,0}$) is shown in FIG. 7. The SCR process was performed under the conditions that a reaction fluid contained 200 ppm of $NO_X$, 200 ppm of $NH_3$, 3 vol. % of O2, 6 vol. % of $H_2O$, and an inert gas of $N_2$, a total flow rate was 500 mL·min$^{-1}$, and a space velocity was 30,000 hr$^{-1}$. Referring to FIG. 7, it can be seen that the catalyst of Embodiment 2 exhibited more desirable redox properties to selectively activate N—O bonds or N—H bonds in the low temperature range (180° C.), when compared to that of Embodiment 1. This is manifested by the fact that the catalyst of Embodiment 2 synthesized through the supercritical $CO_2$ extraction had a higher value of $X_{NOX}/X_{NOX,0}$ and a lower rate of decrease of the value of $X_{NOX}/X_{NOX,0}$ in the absence of $O_2$ compared to the catalyst of Embodiment 1.

Figure 8A:
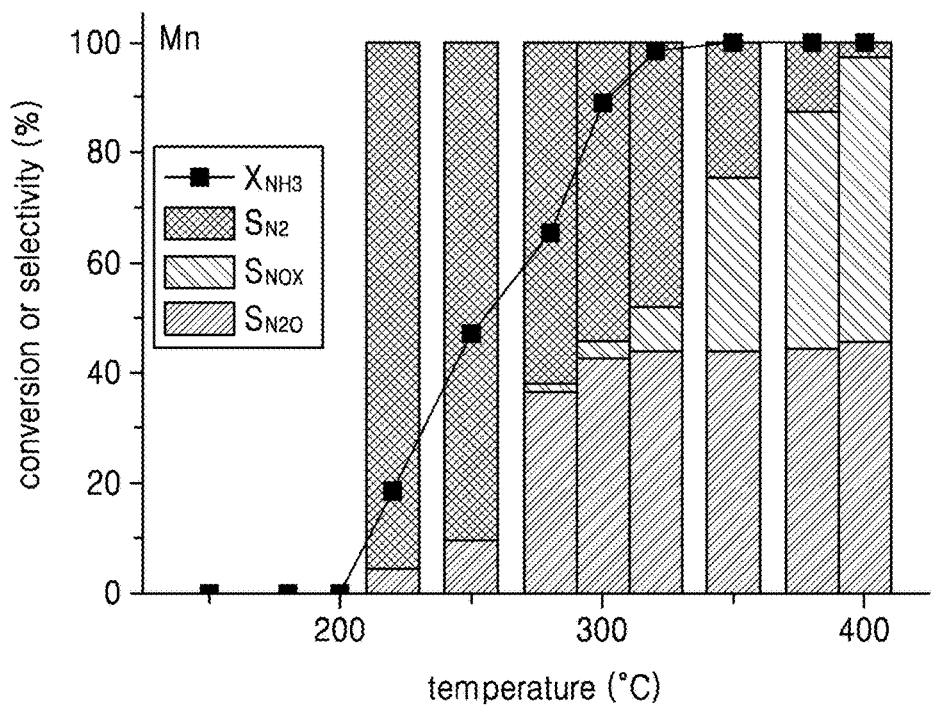
FIGS. 8A and 8B illustrate graphs showing ammonia conversions $X_{NH3}$ and $N_2/NO_X/N_2O$ selectivity $S_{N2}/S_{NOX}/S_{N2O}$ in a selective catalytic oxidation (SCO) reaction of the catalysts synthesized in Embodiments 1 and 2.
Figure 8B:
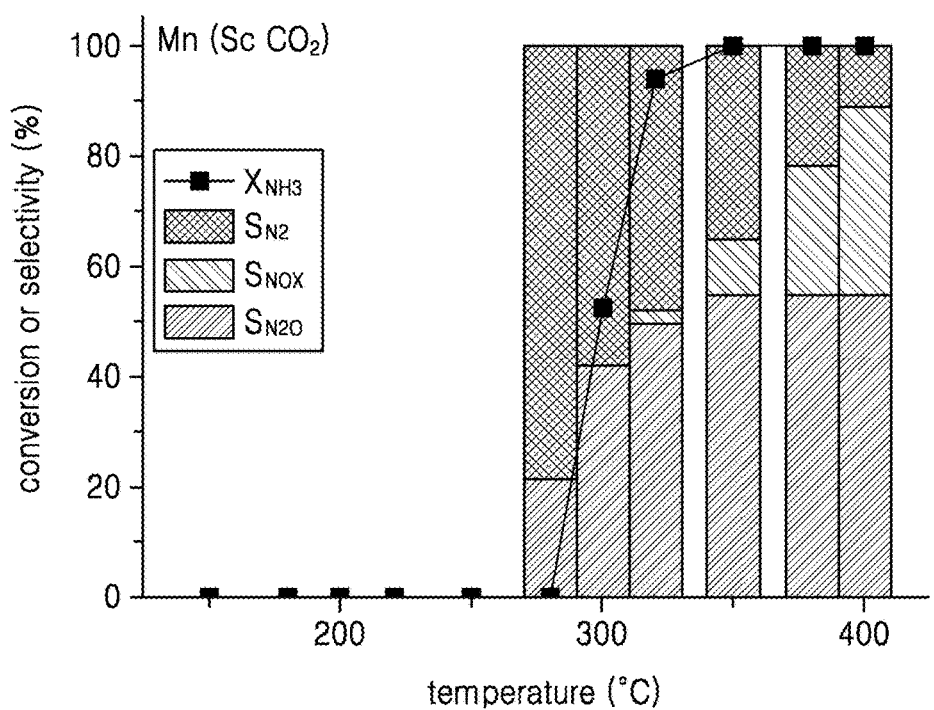

Experimental Example 4: Performance analysis of SCO reaction (1) The performance of SCO process was measured using the catalysts of Embodiments 1 and 2. FIGS. 8A and 8B show an ammonia ($NH_3$) conversion $X_{NH3}$ and selectivity $S_{N2}/S_{NOX}/S_{N2O}$ to products ($N_2$, $NO_X$, and $N_2O$) in a temperature range of 150° C. to 400° C. The SCO process was performed under the conditions that a reaction fluid contained 200 ppm of $NH_3$, 3 vol. % of O2, 6 vol. % of $H_2O$, and an inert gas of $N_2$, a total flow rate was 500 mL·min$^{-1}$, and a space velocity was 30,000 hr$^{-1}$. Referring to FIGS. 8A and 8B, it can be seen that the catalyst of Embodiment 2 exhibited improved performance in the temperature range of 150° C. to 400° C. compared to that of Embodiment 1, which is manifested by the fact that the catalyst of Embodiment 2 synthesized through the supercritical $CO_2$ extraction had improved values of $X_{NOX}$ due to the SCO reaction, a higher selectivity $S_{N2}$ to a desirable product, and lower selectivity $S_{NOX}$ and $S_{N2O}$ to undesirable products at the same reaction temperature compared to the catalyst of Embodiment 1 synthesized by the conventional method. This indicates that the catalyst of Embodiment 2 has Brönsted acid, Lewis acid, and redox properties that are more preferable to selectively activate N—H bonds than those of the catalyst of Embodiment 1 in the surface thereof.

Experimental Example 5: Performance Analysis of SCO Reaction (2)

Figure 9A:
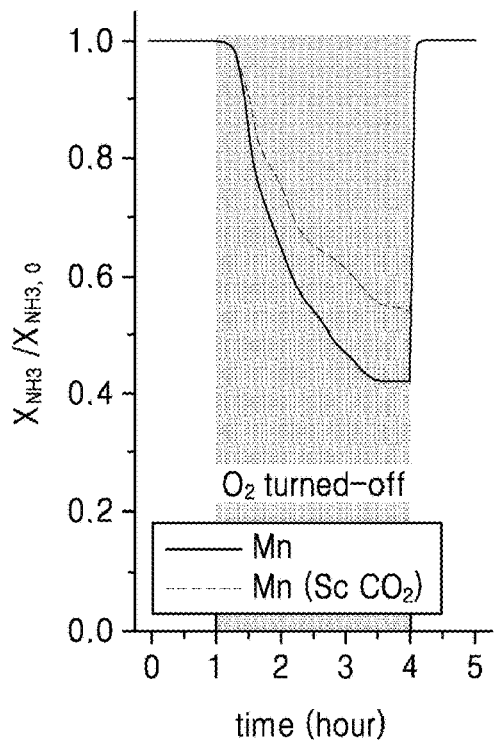
FIGS. 9A and 9B illustrate graphs showing performance changes $X_{NH3}/X_{NH3,0}$ and $S_{N2}$ according to the presence or absence of $O_2$ in the SCO reaction of the catalysts synthesized in Embodiments 1 and 2.
Figure 9B:
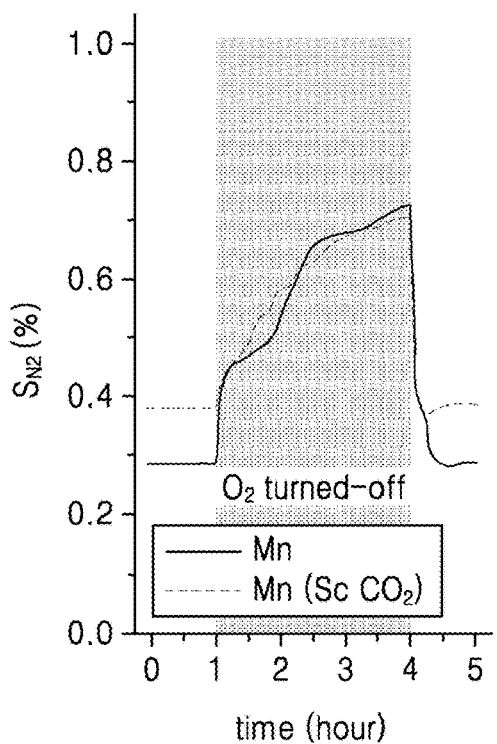

The performance of SCO process was measured using the catalysts of Embodiments 1 and 2. A decrease trend of a $NH_3$ conversion $X_{NH3}$ in the presence or absence of $O_2$ at 350° C. (1 to 4 hours) was divided by the initial $NH_3$ conversion $X_{NH3,0}$ and the result ($X_{NH3}/X_{NH3,0}$) thereof is shown in FIG. 9A. Also, the selectivity $S_{N2}$ to nitrogen, which is a desirable product, shown in FIG. 9B. The SCO process was performed under the conditions that a reaction fluid contained 200 ppm of $NH_3$, 3 vol. % of O2, 6 vol. % of $H_2O$, and an inert gas of $N_2$, a total flow rate was 500 mL·min$^{-1}$, and a space velocity was 30,000 hr$^{-1}$. Referring to FIGS. 9A and 9B, it can be seen that the catalyst of Embodiment 2 exhibited more desirable redox properties to selectively activate N—H bonds in the high temperature range (350° C.), when compared to that of Embodiment 1. This is manifested by the fact that the catalyst of Embodiment 2 synthesized through the supercritical $CO_2$ extraction had a higher value of $X_{NH3}/X_{NH3,0}$, a lower rate of decrease of the value of $X_{NH3}/X_{NH3,0}$, and a higher value of $S_{N2}$ in the absence of $O_2$ compared to the catalyst of Embodiment 1.

Experimental Example 6: Performance Analysis of SCR Reaction (3)

Figure 10:
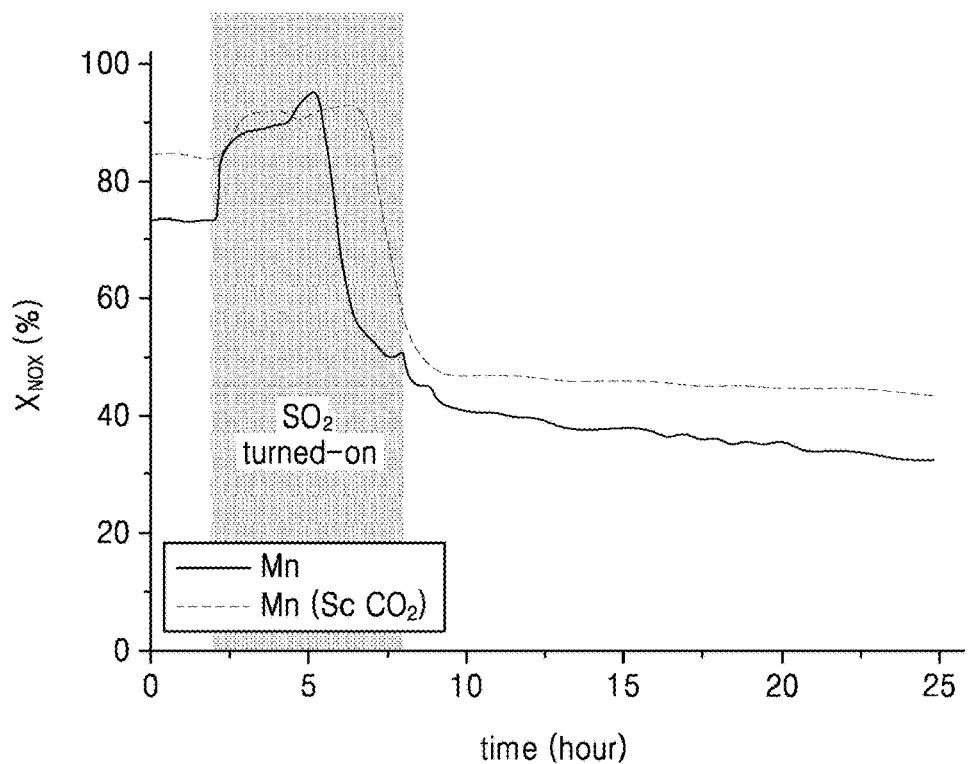
FIG. 10 is a graph showing long-term stability in the presence of 50 ppm of $SO_2$ at low temperature (180° C.) in the SCR reaction of the catalysts synthesized in Embodiments 1 and 2.

The performance of SCR process for the catalysts of Embodiments 1 and 2 was measured in a reaction fluid contained 200 ppm of $NO_X$, 200 ppm of NH3, 3 vol % of $O_2$, 6 vol % of $H_2O$, and an inert gas of $N_2$, at 180° C. and at a space velocity of 30,000 hr$^{-1}$, and the results thereof are shown in FIG. 10. Specifically, based on the poisoning phenomenon of the catalyst surface caused by $H_2O/SO_2/AS$ (ammonium sulfate)/ABS (ammonium bisulfate), etc., a decrease trend of the $NO_X$ conversions $X_{NOX}$ of the catalysts was observed. Referring to FIG. 10, the catalyst of Embodiment 2 exhibits a higher $NO_X$ conversion $X_{NOX}$ in the presence and absence of $SO_2$ in the low temperature range (180° C.) compared to that of Embodiment 1. This indicates that the catalyst of Embodiment 2 has stronger resistance to poisons supplied/generated during the reaction compared to that of Embodiment 1. This indicates that the catalyst of Embodiment 2 synthesized through the supercritical $CO_2$ extraction imparts excellent resistance to poisons ($H_2O/SO_2$/ AS/ABS) compared to the catalyst of Embodiment 1 synthesized by the conventional method, and has an improved life span.

Experimental Example 7: Performance Analysis of SCR Reaction (4)

Figure 11:
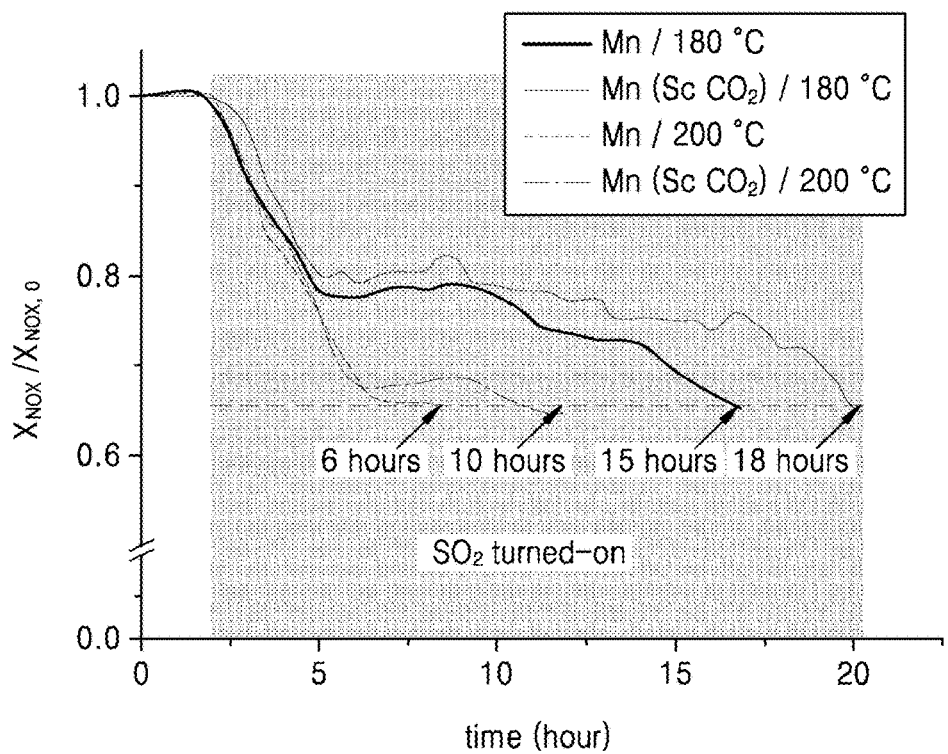
FIG. 11 is a graph showing long-term stability in the presence of 500 ppm $SO_2$ at low temperatures (180° C. and 200° C.) in the SCR reaction of catalysts synthesized in Embodiments 1 and 2.

The performance of SCR process for the catalysts of Embodiments 1 and 2 was measured in a reaction fluid contained 200 ppm of $NO_X$, 200 ppm of $NH_3$, 3 vol % of $O_2$, 6 vol % of $H_2O$, and an inert gas of $N_2$, at 180° C. and 200° C. and at a space velocity of 30,000 hr$^{-1}$, and the results thereof are shown in FIG. 11. Specifically, $NO_X$ conversions $X_{NOX}$ of the catalysts were divided by the corresponding initial $NO_X$ conversions $X_{NOX,0}$ (in the absence of $SO_2$). In addition, based on the poisoning phenomenon of the catalyst surface caused by $H_2O/SO_2/AS$ (ammonium sulfate)/ABS (ammonium bisulfate), the time required for the catalysts to show 65% of performance ($X_{NOX}/X_{NOX,0}$~0.65) compared to the initial performance was measured. Referring to FIG. 11, it was observed that the catalyst of Embodiment 2 (10 hours at 180° C. and 18 hours at 200° C.) exhibited improved resistance to poisons in a low temperature range compared to the catalyst of Embodiment 1 (6 hours at 180° C. and 15 hours at 200° C.). This indicates that the catalyst of Embodiment 2 synthesized through the supercritical $CO_2$ extraction imparts excellent resistance to poisons ($H_2O/SO_2$/ AS/ABS) compared to the catalyst of Embodiment 1 synthesized by the conventional method, and has an improved life span.

According to one aspect of the present invention made as described above, a catalyst in which oxides of one or more metals selected from the above-described periodic table are dispersed in a support is synthesized using supercritical $CO_2$ extraction, so that the distribution/number/intensity of Brönsted acid sites, Lewis acid sites, surface labile oxygen species, oxygen vacancies, etc., present on a surface of the catalyst and the redox properties can be preferably controlled.

In addition, the metal oxide catalyst prepared using the supercritical $CO_2$ extraction enables selective activation of bonds inherent in reactants, for example, N—O bond, N—H bond, C—O bond, and O—H bond, so that it is possible to implement a high rate and an increased conversion or selectivity compared to catalysts synthesized by previously reported methods (filtration, washing, or thermal drying). Catalysts synthesized based on the advantages provided by the above-described supercritical $CO_2$ extraction may have remarkably improved reactivity and durability compared to catalysts synthesized by conventional methods.

However, the above-described effects are merely examples and the scope of the present invention is not limited thereto.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. A method of synthesizing a metal oxide catalyst, which comprises an active site containing at least one type of metal oxide and a support for loading the active site, the method using supercritical carbon dioxide ($CO_2$) extraction, comprising:
    precipitating a precursor of metal oxide catalyst crystalline grains onto a surface of the support after dissolving the precursor of the metal oxide catalyst crystalline grains in a synthetic solvent;
    drying a catalyst crystalline grain precursor-support intermediate product using supercritical $CO_2$ extraction; and
    calcining the dried catalyst crystalline grain precursor-support intermediate product to synthesize a metal oxide catalyst,
    wherein the supercritical $CO_2$ extraction is performed at a temperature ranging from 50 to 150° C., for 0.1 to 24 hours, at a flow rate ranging from $10^{-5}$ to $10^5$ mL min$^{-1}$, and at a $CO_2$ pressure ranging from 75 to 150 atm.

2. The method of claim 1, wherein a supercritical $CO_2$ fluid extracted by the supercritical $CO_2$ extraction weakens an interaction between the support and the synthetic solvent.

3. A metal oxide catalyst comprising:
    an active site containing at least one type of metal oxide; and
    a support onto which the active site is loaded,
    wherein the metal oxide is an oxide of a metal selected from the group consisting of transition metals (atomic number 21 to 29, 39 to 47, 72 to 79, or 104 to 108), lanthanide (atomic number 57 to 71), post-transition metals (atomic number 13, 30 to 31, 48 to 50, 80 to 84, and 112), and metalloids (atomic number 14, 32 to 33, 51 to 52, and 85) in the periodic table, and a combination thereof, and wherein the support contains at least one element selected from the group consisting of alkaline earth metals (atomic number 4, 12, 20, 38, 56, and 88), transition metals (atomic number 21-29, 39-47, and 72-79, or 104-108), lanthanide (atomic number 57-71), post-transition metals (atomic number 13, 30-31, 48-50, 80-84, and 112), and metalloids (atomic number 14, 32-33, 51-52, and 85) in the periodic table, and carbon (C); and wherein the support contains at least one oxide of the at least one element.

4. The metal oxide catalyst of claim 3 wherein the active site is porous and has a diameter range of 0.1 nm to 500 μm.

5. The metal oxide catalyst of claim 3 wherein the active site has a composition range of $10^{-4}$ to 50 parts by weight based on 100 parts by weight of the support.

6. The metal oxide catalyst of claim 3 wherein the support has microporosity, mesoporosity, microporosity, or hierarchical porosity.

* * * * *